(12) United States Patent
Pope et al.

(10) Patent No.: US 9,210,140 B2
(45) Date of Patent: Dec. 8, 2015

(54) REMOTE FUNCTIONALITY SELECTION

(75) Inventors: Steven L. Pope, Costa Mesa, CA (US); David Riddoch, Cambridge (GB)

(73) Assignee: SOLARFLARE COMMUNICATIONS, INC., Irvine, CA (US)

(*) Notice: Subject to any disclaimer, the term of this patent is extended or adjusted under 35 U.S.C. 154(b) by 592 days.

(21) Appl. No.: 12/858,345

(22) Filed: Aug. 17, 2010

(65) Prior Publication Data

US 2011/0202983 A1 Aug. 18, 2011

Related U.S. Application Data

(60) Provisional application No. 61/235,256, filed on Aug. 19, 2009.

(51) Int. Cl.
| | |
|---|---|
| *G06F 9/00* | (2006.01) |
| *H04L 29/06* | (2006.01) |
| *G06F 21/57* | (2013.01) |
| *G06F 21/62* | (2013.01) |
| *H04L 12/24* | (2006.01) |

(52) U.S. Cl.
CPC ............ *H04L 63/061* (2013.01); *G06F 21/572* (2013.01); *G06F 21/6218* (2013.01); *H04L 41/0803* (2013.01); *H04L 41/28* (2013.01); *G06F 2221/2149* (2013.01); *H04L 63/12* (2013.01)

(58) Field of Classification Search
USPC ..................................................... 726/14–16
See application file for complete search history.

(56) References Cited

U.S. PATENT DOCUMENTS 5,272,599 A 12/1993 Koenen
5,325,532 A 6/1994 Crosswy et al.
(Continued)

FOREIGN PATENT DOCUMENTS

EP 620521 A2 10/1994
WO 0148972 A1 7/2001
(Continued)

OTHER PUBLICATIONS

Aguiar et al. "Embedded systems' virtualization: The next challenge?" Rapid System Prototyping (RSP), 2010 21st IEEE International Symposium on 2010, pp. 1-7.*
(Continued)

*Primary Examiner* — Roderick Tolentino
(74) *Attorney, Agent, or Firm* — Haynes Beffel & Wolfeld LLP; Warren S. Wolfeld

(57) ABSTRACT

A network interface device providing a set of functions in hardware and being operable in first and second modes: in a first mode, the network interface device being configured to operate with a selected configuration of the set of functions; and in a second mode, the network interface device being operable to select a particular configuration of the set of functions in accordance with configuration instructions received at the network interface device; the network interface device being configured to, on receiving a network message having one or more predetermined characteristics and comprising an authentication key and one or more configuration instructions defining a particular configuration of the set of functions: verify the authentication key; and if the authentication key is successfully verified, select the particular configuration of the set of functions defined in the configuration instructions of the network message.

32 Claims, 2 Drawing Sheets

(56) References Cited

U.S. PATENT DOCUMENTS

| | | |
|---|---|---|
| 5,946,189 A | 8/1999 | Koenen et al. |
| 6,098,112 A | 8/2000 | Ishijima et al. |
| 6,157,721 A | 12/2000 | Shear et al. |
| 6,160,554 A | 12/2000 | Krause |
| 6,304,945 B1 | 10/2001 | Koenen |
| 6,349,035 B1 | 2/2002 | Koenen |
| 6,438,130 B1 | 8/2002 | Kagan et al. |
| 6,502,203 B2 | 12/2002 | Barron et al. |
| 6,530,007 B2 | 3/2003 | Olarig et al. |
| 6,667,918 B2 | 12/2003 | Leader et al. |
| 6,718,392 B1 | 4/2004 | Krause |
| 6,728,743 B2 | 4/2004 | Shachar |
| 6,735,642 B2 | 5/2004 | Kagan et al. |
| 6,768,996 B1 | 7/2004 | Steffens et al. |
| 6,904,534 B2 | 6/2005 | Koenen |
| 6,950,961 B2 | 9/2005 | Krause et al. |
| 6,978,331 B1 | 12/2005 | Kagan et al. |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,650,386 B2 | 1/2010 | McMahan et al. |
| 7,653,754 B2 | 1/2010 | Kagan et al. |
| 7,657,659 B1 * | 2/2010 | Lambeth et al. ............... 709/250 |
| 7,688,853 B2 | 3/2010 | Santiago et al. |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,978,606 B2 | 7/2011 | Buskirk et al. |
| 8,000,336 B2 | 8/2011 | Harel |
| 2002/0059052 A1 | 5/2002 | Bloch et al. |
| 2002/0112139 A1 | 8/2002 | Krause et al. |
| 2002/0129293 A1 | 9/2002 | Hutton et al. |
| 2002/0140985 A1 | 10/2002 | Hudson |
| 2002/0156784 A1 | 10/2002 | Hanes et al. |
| 2003/0007165 A1 | 1/2003 | Hudson |
| 2003/0055900 A1 * | 3/2003 | Glas et al. ............... 709/205 |
| 2003/0058459 A1 | 3/2003 | Wu et al. |
| 2003/0063299 A1 | 4/2003 | Cowan et al. |
| 2003/0065856 A1 | 4/2003 | Kagan et al. |
| 2003/0081060 A1 | 5/2003 | Zeng et al. |
| 2003/0172330 A1 | 9/2003 | Barron et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2004/0034603 A1 | 2/2004 | Hastings et al. |
| 2004/0071250 A1 | 4/2004 | Bunton et al. |
| 2004/0141642 A1 | 7/2004 | Zeng et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210754 A1 | 10/2004 | Barron et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0021968 A1 | 1/2005 | Zimmer et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0231751 A1 | 10/2005 | Wu et al. |
| 2005/0246552 A1 * | 11/2005 | Bade et al. ............... 713/193 |
| 2006/0026443 A1 | 2/2006 | McMahan et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0168153 A1 * | 7/2006 | Lin ............... 709/220 |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0188351 A1 | 8/2007 | Brown et al. |
| 2007/0220183 A1 | 9/2007 | Kagan et al. |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0147828 A1 | 6/2008 | Enstone et al. |
| 2008/0148395 A1 * | 6/2008 | Brock ............... 726/21 |
| 2008/0148400 A1 | 6/2008 | Barron et al. |
| 2008/0177890 A1 | 7/2008 | Krause et al. |
| 2008/0209532 A1 * | 8/2008 | Wen et al. ............... 726/9 |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0007228 A1 * | 1/2009 | Balay et al. ............... 726/1 |
| 2009/0158048 A1 * | 6/2009 | Kim et al. ............... 713/184 |
| 2009/0165003 A1 | 6/2009 | Jacobson et al. |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0287936 A1 * | 11/2009 | Ohkado ............... 713/183 |
| 2009/0300434 A1 * | 12/2009 | Gollub et al. ............... 714/53 |
| 2009/0302923 A1 | 12/2009 | Smeloy et al. |
| 2010/0088437 A1 | 4/2010 | Zahavi |
| 2010/0138298 A1 * | 6/2010 | Fitzgerald et al. ......... 705/14.53 |
| 2010/0138840 A1 | 6/2010 | Kagan et al. |
| 2010/0169507 A1 * | 7/2010 | Sahita et al. ............... 709/250 |
| 2010/0169880 A1 | 7/2010 | Haviv et al. |
| 2010/0188140 A1 | 7/2010 | Smeloy |
| 2010/0189206 A1 | 7/2010 | Kagan |
| 2010/0265849 A1 | 10/2010 | Harel |
| 2010/0274876 A1 | 10/2010 | Kagan et al. |
| 2010/0306505 A1 * | 12/2010 | Yamada et al. ............... 713/168 |
| 2010/0318800 A1 * | 12/2010 | Simon et al. ............... 713/171 |
| 2011/0004457 A1 | 1/2011 | Haviv et al. |
| 2011/0010557 A1 | 1/2011 | Kagan et al. |
| 2011/0022695 A1 * | 1/2011 | Dalal et al. ............... 709/222 |
| 2011/0029669 A1 | 2/2011 | Chuang et al. |
| 2011/0029847 A1 | 2/2011 | Goldenberg et al. |
| 2011/0044344 A1 | 2/2011 | Hudson et al. |

(56) References Cited

U.S. PATENT DOCUMENTS

| | | |
|---|---|---|
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1 | 5/2011 | Bloch et al. |
| 2011/0173352 A1 | 7/2011 | Sela et al. |

FOREIGN PATENT DOCUMENTS

| | | | |
|---|---|---|---|
| WO | 0230130 A1 | 4/2002 | |
| WO | 0235838 A1 | 5/2002 | |
| WO | 2008127672 A2 | 10/2008 | |
| WO | 2009134219 A1 | 11/2009 | |
| WO | 2009136933 A1 | 11/2009 | |
| WO | 2010020907 A2 | 2/2010 | |
| WO | 2010087826 A1 | 8/2010 | |
| WO | 2011043769 A1 | 4/2011 | |
| WO | 2011053305 A1 | 5/2011 | |
| WO | 2011053330 A1 | 5/2011 | |

OTHER PUBLICATIONS

Mohamed, N. "Self-configuring communication middleware model for multiple network interfaces" Computer Software and Applications Conference, 2005. COMPSAC 2005. 29th Annual International 2005, pp. 115-120 vol. 2.*

Extended European search report mailed Dec. 10, 2010 in EP 10 17 3326.

Gordon E. Moore; Electronics, vol. 38, No. 8, pp. 114-117, 1965, Apr. 19, 1965.

Jack B. Dennis and Earl C. Van Horn; Communications of the ACM, vol. 9, No. 3, pp. 143-155, Mar. 1966.

Marvin Zelkowitz; Communications of the ACM, vol. 14, No. 6, p. 417-418, Jun. 1971.

J. Carver Hill; Communications of the ACM, vol. 16, No. 6, p. 350-351, Jun. 1973.

F.F. Kuo; ACM Computer Communication Review, vol. 4 No. 1, Jan. 1974.

Vinton Cerf, Robert Kahn; IEEE Transactions on Communications, vol. COM-22, No. 5, pp. 637-648, May 1974.

V. Cerf, et al.; ACM Computer Communication Review, vol. 6 No. 1, p. 1-18, Jan. 1976.

Robert M. Metcalfe and David R. Boggs; Communications of the ACM, vol. 19, Issue 7, pp. 395-404, Jul. 1976.

P. Kermani and L. Kleinrock; Computer Networks, vol. 3, No. 4, pp. 267-286, Sep. 1979.

John M. McQuillan, et al.; Proceedings of the 6th Data Communications Symposium, p. 63, Nov. 1979.

Andrew D. Birrell, et al.; Communications of the ACM, vol. 25, Issue 4, pp. 260-274, Apr. 1982.

Ian M. Leslie, et al.; ACM Computer Communication Review, vol. 14, No. 2, pp. 2-9, Jun. 1984.

John Nagle; ACM Computer Communication Review, vol. 14, No. 4, p. 11-17, Oct. 1984.

Robert M. Brandriff, et al.; ACM Computer Communication Review, vol. 15, No. 4, Sep. 1985.

C. Kline; ACM Computer Communication Review, vol. 17, No. 5, Aug. 1987.

Christopher A. Kent, Jeffrey C. Mogul; ACM Computer Communication Review, vol. 17, No. 5, pp. 390-401, Oct. 1987.

Gary S. Delp, et al.; ACM Computer Communication Review, vol. 18, No. 4, p. 165-174, Aug. 1988.

David R. Boggs, et al.; ACM Computer Communication Review, vol. 18, No. 4, p. 222-234, Aug. 1988.

H. Kanakia and D. Cheriton; ACM Computer Communication Review, vol. 18, No. 4, p. 175-187, Aug. 1988.

V. Jacobson; ACM Computer Communication Review, vol. 18, No. 4, p. 314-329, Aug. 1988.

David D. Clark; ACM Computer Communication Review, vol. 18, No. 4, pp. 106-114, Aug. 1988.

Paul V. Mockapetris, Kevin J. Dunlap; ACM Computer Communication Review, vol. 18, No. 4, pp. 123-133, Aug. 1988.

Margaret L. Simmons and Harvey J. Wasserman; Proceedings of the 1988 ACM/IEEE conference on Supercomputing, p. 288-295, Orlando, Florida, Nov. 12, 1988.

David A. Borman; ACM Computer Communication Review, vol. 19, No. 2, p. 11-15, Apr. 1989.

R. Braden, et al.; ACM Computer Communication Review, vol. 19, No. 2, p. 86-94, Apr. 1989.

David D. Clark, et al.; IEEE Communications Magazine, vol. 27, No. 6, pp. 23-29, Jun. 1989.

David R. Cheriton; ACM Computer Communication Review, vol. 19, No. 4, p. 158-169, Sep. 1989.

Derek Robert McAuley; PhD Thesis, University of Cambridge, Sep. 1989.

Craig Partridge; ACM Computer Communication Review, vol. 20, No. 1, p. 44-53, Jan. 1990.

D. D. Clark and D. L. Tennenhouse; ACM Computer Communication Review, vol. 20, No. 4, pp. 200-208, Sep. 1990.

Eric C. Cooper, et al.; ACM Computer Communication Review, vol. 20, No. 4, p. 135-144, Sep. 1990.

Bruce S. Davie; ACM Computer Communication Review, vol. 21, No. 4, Sep. 1991.

C. Brendan S. Traw, et al.; ACM Computer Communication Review, vol. 21, No. 4, p. 317-325, Sep. 1991.

Ian Leslie and Derek R. McAuley; ACM Computer Communication Review, vol. 21, No. 4, p. 327, Sep. 1991.

Mark Hayter, Derek McAuley; ACM Operating Systems Review, vol. 25, Issue 4, p. 14-21, Oct. 1991.

Gregory G. Finn; ACM Computer Communication Review, vol. 21, No. 5, p. 18-29, Oct. 1991.

Greg Chesson; Proceedings of the Third International Conference on High Speed Networking, Nov. 1991.

Michael J. Dixon; University of Cambridge Computer Laboratory Technical Report No. 245, Jan. 1992.

Danny Cohen, Gregory Finn, Robert Felderman, Annette DeSchon; Made available by authors, Jan. 10, 1992.

Gene Tsudik; ACM Computer Communication Review, vol. 22, No. 5, pp. 29-38, Oct. 1992.

Peter Steenkiste; ACM Computer Communication Review, vol. 22, No. 4, Oct. 1992.

Paul E. McKenney and Ken F. Dove; ACM Computer Communication Review, vol. 22, No. 4, Oct. 1992.

Erich Ruetsche and Matthias Kaiserswerth; Proceedings of the IFIP TC6/WG6.4 Fourth International Conference on High Performance Networking IV, Dec. 14, 1992.

C. Traw and J. Smith; IEEE Journal on Selected Areas in Communications, pp. 240-253, Feb. 1993.

E. Ruetsche; ACM Computer Communication Review, vol. 23, No. 3, Jul. 1993.

Jonathan M. Smith and C. Brendan S. Traw; IEEE Network, vol. 7, Issue 4, pp. 44-52, Jul. 1993.

Jeffrey R. Michel; MSci Thesis, University of Virginia, Aug. 1993.

Mark David Hayter; PhD Thesis, University of Cambridge, Sep. 1993.

Jonathan Kay and Joseph Pasquale; ACM Computer Communication Review, vol. 23, No. 4, pp. 259-268, Oct. 1993.

W. E. Leland, et al.; ACM Computer Communication Review, vol. 23, No. 4, p. 85-95, Oct. 1993.

C. A. Thekkath, et al.; ACM Computer Communication Review, vol. 23, No. 4, Oct. 1993.

Raj K. Singh, et al.; Proceedings of the 1993 ACM/IEEE conference on Supercomputing, p. 452-461, Portland, Oregon, Nov. 15, 1993.

Peter Druschel and Larry L. Peterson; ACM Operating Systems Review, vol. 27, Issue 5, p. 189-202, Dec. 1993.

Matthias Kaiserswerth; IEEE/ACM Transactions on Networking, vol. 1, No. 6, p. 650-663, Dec. 1993.

Chris Maeda, Brian Bershad; ACM Operating Systems Review, vol. 27, Issue 5, p. 244-255, Dec. 1993.

Greg Regnier, et al.; IEEE Micro, vol. 24, No. 1, p. 24-31, Jan. 1994.

(56) References Cited

OTHER PUBLICATIONS

J. Vis; ACM Computer Communication Review, vol. 24, No. 1, pp. 7-11, Jan. 1994.
Danny Cohen, Gregory Finn, Robert Felderman, Annette DeSchon; Journal of High Speed Networks, Jan. 3, 1994.
Gregory G. Finn and Paul Mockapetris; Proceedings of InterOp '94, Las Vegas, Nevada, May 1994.
Stuart Wray, et al.; Proceedings of the International Conference on Multimedia Computing and Systems, p. 265-273, Boston, May 94.
Various forum members; Message-Passing Interface Forum, University of Tennessee, Knoxville, 1994, May 5, 1994.
Raj K. Singh, et al.; ACM Computer Communication Review, vol. 24, No. 3, p. 8-17, Jul. 1994.
P. Druschel, et al.; ACM Computer Communication Review, vol. 24, No. 4, Oct. 1994.
Sally Floyd; ACM Computer Communication Review, vol. 24, No. 5, p. 8-23, Oct. 1994.
A. Edwards, et al.; ACM Computer Communication Review, vol. 24, No. 4, pp. 14-23, Oct. 1994.
L. S. Brakmo, et al.; ACM Computer Communication Review, vol. 24, No. 4, p. 24-35, Oct. 1994.
A. Romanow and S. Floyd; ACM Computer Communication Review, vol. 24, No. 4, p. 79-88, Oct. 1994.
R. J. Black, I. Leslie, and D. McAuley; ACM Computer Communication Review, vol. 24, No. 4, p. 158-167, Oct. 1994.
Babak Falsafi, et al.; Proceedings of the 1994 conference on Supercomputing, pp. 380-389, Washington D.C., Nov. 14, 1994.
Mengjou Lin, et al.; Proceedings of the 1994 conference on Supercomputing, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, Oct. 1995.
C. Partridge, J. Hughes, J. Stone; ACM Computer Communication Review, vol. 25, No. 4, p. 68-76, Oct. 1995.
A. Edwards, S. Muir; ACM Computer Communication Review, vol. 25, No. 4, Oct. 1995.
J. C. Mogul; ACM Computer Communication Review, vol. 25, No. 4, Oct. 1995.
Thorsten von Eicken, et al.; ACM Operating Systems Review, vol. 29, Issue 5, p. 109-126, Dec. 1995.
D. L. Tennenhouse, D. J. Wetherall; ACM Computer Communication Review, vol. 26, No. 2, pp. 15-20, Apr. 1996.
Paul Ronald Barham; PhD Thesis, University of Cambridge, Jul. 1996.
Chi-Chao Chang, et al.; Proceedings of the 1996 ACM/IEEE conference on Supercomputing, Pittsburgh, Nov. 17, 1996.
Joe Touch, et al.; "Atomic-2" slides, Gigabit Networking Workshop '97 Meeting, Kobe, Japan, Apr. 1997, 10pp.
Joe Touch, et al.; "Host-based Routing Using Peer DMA," Gigabit Networking Workshop '97 Meeting, Kobe, Japan, Apr. 1997, 2pp.
O. Angin, et al.; ACM Computer Communication Review, vol. 27, No. 3, pp. 100-117, Jul. 1997.
Charles P. Thacker and Lawrence C. Stewart; ACM Operating Systems Review, vol. 21, Issue 4, p. 164-172, 1987, Oct. 1997.
Ed Anderson, et al.; Proceedings of the 1997 ACM/IEEE conference on Supercomputing, p. 1-17, San Jose, California, Nov. 16, 1997.
Harvey J. Wassermann, et al.; Proceedings of the 1997 ACM/IEEE conference on Supercomputing, p. 1-11, San Jose, California, Nov. 16, 1997.
Philip Buonadonna, et al.; Proceedings of the 1998 ACM/IEEE conference on Supercomputing, p. 1-15, Orlando, Florida, Nov. 7, 1998.
Parry Husbands and James C. Hoe; Proceedings of the 1998 ACM/IEEE conference on Supercomputing, p. 1-15, Orlando, Florida, Nov. 7, 1998.
Michael S. Warren, et al.; Proceedings of the 1998 ACM/IEEE conference on Supercomputing, Orlando, Florida, Nov. 7, 1998.
John Salmon, et al.; Proceedings of the 1998 ACM/IEEE conference on Supercomputing, Orlando, Florida, Nov. 7, 1998.
Boon S. Ang, et al.; Proceedings of the 1998 ACM/IEEE conference on Supercomputing, Orlando, Florida, Nov. 7, 1998.
S. L. Pope, et al.; Parallel and Distributed Computing and Networks, Brisbane, Australia, Dec. 1998.
M. de Vivo, et al.; ACM Computer Communication Review, vol. 29, No. 1, pp. 81-85, Jan. 1999.
M. Allman; ACM Computer Communication Review, vol. 29, No. 3, Jul. 1999.
Steve Muir and Jonathan Smith; Technical Report MS-CIS-00-04, University of Pennsylvania, Jan. 2000.
Patrick Crowley, et al.; Proceedings of the 14th international conference on Supercomputing, pp. 54-65, Santa Fe, New Mexico, May 8, 2000.
Jonathan Stone, Craig Partridge; ACM Computer Communication Review, vol. 30, No. 4, pp. 309-319, Oct. 2000.
W. Feng and P. Tinnakornsrisuphap; Proceedings of the 2000 ACM/IEEE conference on Supercomputing, Dallas, Texas, Nov. 4, 2000.
Jenwei Hsieh, et al.; Proceedings of the 2000 ACM/IEEE conference on Supercomputing, Dallas, Texas, Nov. 4, 2000.
Ian Pratt and Keir Fraser; Proceedings of IEEE Infocom 2001, pp. 67-76, Apr. 22, 2001.
Regnier G., "Protocol Onload vs. Offload," 14th Symposium on High Performance Interconnects, Aug. 23, 2006, 1pp.
Montry G., OpenFabrics Alliance presentation slides, 14th Symposium on High Performance Interconnects, Aug. 23, 2006, 8pp.
Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.
Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.
Bruce Lowekamp, et al.; ACM Computer Communication Review, vol. 31, No. 4, Oct. 2001.
Piyush Shivam, et al.; Proceedings of the 2001 ACM/IEEE conference on Supercomputing, pp. 57, Denver, Nov. 10, 2001.
Robert Ross, et al.; Proceedings of the 2001 ACM/IEEE conference on Supercomputing, pp. 11, Denver, Nov. 10, 2001.
E. Blanton and M. Allman; ACM Computer Communication Review, vol. 32, No. 1, Jan. 2002.
Murali Rangarajan, et al.; Technical Report DCR-TR-481, Computer Science Department, Rutgers University, Mar. 2002.
Jon Crowcroft, Derek McAuley; ACM Computer Communication Review, vol. 32, No. 5, Nov. 2002.
Charles Kalmanek; ACM Computer Communication Review, vol. 32, No. 5, pp. 13-19, Nov. 2002.
Jonathan Smith; ACM Computer Communication Review, vol. 32, No. 5, pp. 29-37, Nov. 2002.
NR Adiga, et al.; Proceedings of the 2002 ACM/IEEE conference on Supercomputing, pp. 1-22, Baltimore, Nov. 16, 2002.
Steven J. Sistare, Christopher J. Jackson; Proceedings of the 2002 ACM/IEEE conference on Supercomputing, p. 1-15, Baltimore, Nov. 16, 2002.
R. Bush, D. Meyer; IETF Network Working Group, Request for Comments: 3439, Dec. 2002.
Pasi Sarolahti, et al.; ACM Computer Communication Review, vol. 33, No. 2, Apr. 2003.
Tom Kelly; ACM Computer Communication Review, vol. 33, No. 2, pp. 83-91, Apr. 2003.
Jeffrey C. Mogul; Proceedings of HotOS IX: The 9th Workshop on Hot Topics in Operating Systems, pp. 25-30, May 18, 2003.
Derek McAuley, Rolf Neugebauer; Proceedings of the ACM SIGCOMM 2003 Workshops, Aug. 2003.
Justin Hurwitz, Wu-chun Feng; Proceedings of the 11th Symposium on High Performance Interconnects, Aug. 20, 2003.
Vinay Aggarwal, et al.; ACM Computer Communication Review, vol. 33, No. 5, Oct. 2003.
Wu-chun Feng, et al.; Proceedings of the 2003 ACM/IEEE conference on Supercomputing, Phoenix, Arizona, Nov. 15, 2003.

(56) References Cited

OTHER PUBLICATIONS

Jiuxing Liu, et al.; Proceedings of the 2003 ACM/IEEE conference on Supercomputing, Phoenix, Arizona, Nov. 15, 2003.
Srihari Makineni and Ravi Iyer; Proceedings of the 10th International Symposium on High Performance Computer Architecture, pp. 152, Feb. 14, 2004.
Cheng Jin, et al.; Proceedings of IEEE Infocom 2004, pp. 1246-1259, Mar. 7, 2004.
Andy Currid; ACM Queue, vol. 2, No. 3, 2004, May 1, 2004.
Greg Regnier, et al.; Computer, IEEE Computer Society, vol. 37, No. 11, pp. 48-58, Nov. 2004.
Gregory L. Chesson; United States District Court, Northern District California, San Francisco Division, Feb. 4, 2005.
Edward D. Lazowska, David A. Patterson; ACM Computer Communication Review, vol. 35, No. 2, Jul. 2005.
W. Feng, et al.; Proceedings of the 13th Symposium on High Performance Interconnects, Aug. 17, 2005.
B. Leslie, et al.; J. Comput. Sci. & Technol., vol. 20, Sep. 2005.
P. Balaji, et al.; Proceedings of the IEEE International Conference on Cluster Computing, Sep. 2005.
Humaira Kamal, et al.; Proceedings of the 2005 ACM/IEEE conference on Supercomputing, Seattle, p. 30, Washington, Nov. 12, 2005.
Sumitha Bhandarkar, et al.; ACM Computer Communication Review, vol. 36, No. 1, pp. 41-50, Jan. 2006.
H. K. Jerry Chu; Proceedings of the USENIX Annual Technical Conference, Jan. 1996.
Ken Calvert; ACM Computer Communication Review, vol. 36, No. 2, pp. 27-30, Apr. 2006.
Jon Crowcroft; ACM Computer Communication Review, vol. 36, No. 2, pp. 51-52, Apr. 2006.
Greg Minshall, et al.; ACM Computer Communication Review, vol. 36, No. 3, pp. 79-92, Jul. 2006.
David Wetherall; ACM Computer Communication Review, vol. 36, No. 3, pp. 77-78, Jul. 2006.
Patrick Geoffray; HPCWire article: http://www.hpcwire.com/features/17886984.html, Aug. 18, 2006.
Geoffray P., "Protocol off-loading vs on-loading in high-performance networks," 14th Symposium on High Performance Interconnects, Aug. 23, 2006, 5pp.
Jose Carlos Sancho, et al.; Proceedings of the 2006 ACM/IEEE conference on Supercomputing, Tampa, Florida, Nov. 11, 2006.
Sayantan Sur, et al.; Proceedings of the 2006 ACM/IEEE conference on Supercomputing, Tampa, Florida, Nov. 11, 2006.
Steven Pope, David Riddoch; ACM Computer Communication Review, vol. 37, No. 2, pp. 89-92, Mar. 19, 2007.
Kieran Mansley, et al.; Euro-Par Conference 2007, pp. 224-233, Rennes, France, Aug. 28, 2007.
M. Kaiserswerth; IEEE/ACM Transactions in Networking vol. 1, Issue 6, pp. 650-663, Dec. 1993.
Danny Cohen, et al.; ACM Computer Communication Review, vol. 23, No. 4, p. 32-44, Jul. 1993.
J. Evans and T. Buller; IEEE TCGN Gigabit Networking Workshop, 2001, Apr. 22, 2001.
M.V. Wilkes and R.M. Needham; ACM SIGOPS Operating Systems Review, vol. 14, Issue 1, pp. 21-29, Jan. 1980.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.

\* cited by examiner

REMOTE FUNCTIONALITY SELECTION

BACKGROUND

This invention relates to network interface devices and methods for securely selecting the function set of an electronic device by means of a novel network interface device.

In order to maximise the value extracted from a new electronic product design, a manufacturer will often produce several different versions of the product which share the same basic hardware but differ in the functions they provide. This allows a manufacturer to charge different amounts for essentially the same hardware on the basis that less expensive models will have some of their functions disabled. Following this manufacturing paradigm allows a manufacturer to take advantage from the cost benefits of producing a single hardware design in large quantities, as opposed to producing several hardware designs in smaller quantities.

For example, a single microchip design can be produced with different function sets being enabled for different product lines at the time of manufacture. Chip functions may be enabled or disabled in hardware through the use of programmable registers defining the capabilities of the chip, through the use of external components connected to the chip so as to cripple certain functions, or by brute-force, such as removing external pins or destroying certain areas of the chip. Alternatively, chip functions may be enabled or disabled through the use of different versions of firmware operating on or in combination with the chip.

With respect to the use of firmware to enable or disable certain functions in hardware, it is well-known for firmware to be updateable by an end user through the use of software and hardware tools, or by replacing the chip carrying the firmware. However, these methods require the interaction of the end user (whose technical skill is unknown and could be very limited) and do not provide a secure channel through which updates to the product functionality can be applied. In some cases, it is also possible for programmable chip registers to be reset but this typically requires specialist hardware which is not available to the end user and requires the product to be returned to the vendor.

There is therefore a need for an improved method for securely modifying the functions provided by an electronic product that does not require the interaction of a skilled end-user or technician. For example, it would be advantageous to both the end user and the vendor if there were a mechanism by which the end-user could securely purchase a higher level of product functionality without requiring the end-user to upgrade the hardware of the electronic product. Similarly, it would be advantageous if there were a mechanism by which the configuration settings of a device could be securely managed on behalf of the end-user.

SUMMARY

According to a first aspect of the present invention there is provided a network interface device providing a set of functions in hardware and being operable in first and second modes: in a first mode, the network interface device being configured to operate with a selected configuration of the set of functions; and in a second mode, the network interface device being operable to select a particular configuration of the set of functions in accordance with configuration instructions received at the network interface device; the network interface device being configured to, on receiving a network message having one or more predetermined characteristics and comprising an authentication key and one or more configuration instructions defining a particular configuration of the set of functions: verify the authentication key; and if the authentication key is successfully verified, select the particular configuration of the set of functions defined in the configuration instructions of the network message.

The configuration instructions defining the particular configuration of the set of functions may comprise one or more of:

(a) enabling one or more functions of the set;
(b) disabling one or more functions of the set;
(c) modifying the parameters of a function of the set.

The network interface device can be configured to effect the selection of the particular configuration of the set of functions defined in the configuration instructions by one or more of:

(a) selecting the state of one or more switches at the network interface device;
(b) writing values to a hardware register or non-volatile state memory of the network interface device; and
(c) updating firmware stored at the network interface device.

Preferably the network message comprises one or more data packets received in accordance with a predetermined messaging protocol. The protocol may be the Intelligent Platform Management Interface protocol, or an extension thereof.

The one or more predetermined characteristics may include one or more of:

(a) a predetermined identifier in the headers of at least some of the data packets which together comprise the network message;
(b) a predetermined pattern of data in the network message; and
(c) address information in the network message identifying the endpoint to which the message is directed such as IP address and/or port number.

Suitably the network interface device is configured to enter the second mode on receiving the network message. The network interface device can be configured to enter the second mode on successfully verifying the authentication key.

Preferably the configuration instructions are encrypted and the authentication key is the encrypted configuration instructions. The network interface device can be configured to verify the authentication key by decrypting the encrypted configuration instructions, the authentication key being successfully verified if the encrypted configuration instructions are successfully decrypted. Alternatively the authentication key is one of a password, a cryptographically-signed certificate, a pseudorandom number or a hash of a set of predetermined data.

Preferably the network interface device is configured to verify the authentication key in accordance with the Transport Layer Security (TLS) protocol or Internet Protocol Security (IPsec) protocol.

Suitably the network message is received from a local network entity and the configuration instructions comprised in said network message originate at a remote network entity, the local network entity being a proxy for the remote network entity.

Preferably there exists a cryptographic pair of keys and the authentication key is generated using a private cryptographic key of the pair. Preferably a public cryptographic key of the pair is stored at the network interface device and the network interface device is configured to verify the authentication key using the public key. Preferably the network interface device is configured to use the public key to establish an encrypted channel over which the network message is received. Preferably the private key is stored at a network entity from which the configuration instructions originate, the said network entity being configured to generate the authentication key and transmit the authentication key and configuration instructions to the network interface device. The network entity may be accessible to the network interface device over the internet.

Suitably the network interface device includes a Trusted Platform Module and the Trusted Platform Module holds the public key. The endorsement key of the Trusted Platform Module may be used to establish the encrypted channel.

Preferably the encrypted channel is established in accordance with the Transport Layer Security (TLS) protocol or Internet Protocol Security (IPsec) protocol.

Preferably the network interface device is configured to verify the authentication key at a state machine or processor of the network interface device.

Preferably, on selecting the particular configuration of the set of functions defined in the configuration instructions, the network interface device is configured to message its device driver supported at a data processing system attached to the network interface device to indicate that the function set of the network interface device has changed.

Preferably the network interface device is configured to accept the network message in a low power state. Preferably the network interface device further comprises a management controller operable to perform said verification of the configuration instructions and cause the selection of the particular configuration of the set of functions defined in the configuration instructions, the management controller being active in the low power state.

Suitably the network interface device is attached to a data processing system comprising a Baseboard Management Controller and the network interface device is configured to pass Intelligent Platform Management Interface messages received at the network interface device to the Baseboard Management Controller. On selecting the particular configuration of the set of functions defined in the configuration instructions, the network interface device may be configured to message the Baseboard Management Controller to indicate that the function set of the network interface device has changed.

The network interface device may further comprise a nonvolatile memory and be configured to store the received configuration instructions in said memory and at a later time to perform the selection of the particular configuration of the set of functions defined in the configuration instructions of the network message at the instigation of a software entity supported at a data processing system attached to the network interface device.

Suitably the network interface device is coupled to one or more other devices each providing a set of functions in hardware and each being operable to select a particular configuration of their set of functions in accordance with configuration instructions received at the network interface device, the network interface device being configured to cause each of the one or more other devices to select a particular configuration of their set of functions in accordance with the configuration instructions defined in the network message.

Preferably the network interface device is operable to successfully verify at least two different authentication keys including a first authentication key and a second authentication key, the second authentication key having a lower privilege level than the first authentication key. Preferably the first authentication key permits the network interface device to configure any of the set of functions of the network interface device and the second authentication key permits the network interface device to configure a subset of the set of functions of the network interface device. Preferably the first authentication key, on being successfully verified by the network interface device, allows the network interface device to enable one or more hardware functions; and the second authentication key, on being successfully verified by the network interface device, allows the network interface device to modify one or more parameters of the hardware functions but does not allow the network interface device to enable one or more hardware functions.

Preferably the first authentication key is generated at a first network entity holding a private key and the second authentication key is generated at a second network entity holding a cryptographic key generated using that private key. The first network entity may be accessible to the network interface device over the internet.

Preferably the second network entity is operable to transmit a network message comprising configuration instructions and the second authentication key to the network interface device in accordance with the IPMI protocol. Preferably the second network entity is on a network local to the network interface device.

The network interface device may be one of a network interface card, a switch or a router.

According to a second aspect of the present invention there is provided a method for selecting a configuration of a set of hardware functions of a network interface device, the method comprising: receiving at a network interface device a network message having one or more predetermined characteristics, the network message comprising an authentication key and configuration instructions defining a particular configuration of a set of functions of the network interface device; in response to receiving the network message, verifying the authentication key at the network interface device; and if the authentication key is successfully verified, selecting the particular configuration of the set of functions defined in the configuration instructions of the network message.

According to a third aspect of the present invention there is provided a network interface device and a baseboard management controller, the network interface device providing a set of functions in hardware and being operable in first and second modes: in a first mode, the network interface device being configured to operate with a selected configuration of the set of functions; and in a second mode, the network interface device being operable to select a particular configuration of the set of functions in accordance with configuration instructions received at the network interface device; the network interface device being configured to, on receiving a network message having one or more predetermined characteristics and comprising an authentication key and one or more configuration instructions defining a particular configuration of the set of functions, pass the configuration instructions and authentication key to the baseboard management controller which: verifies the authentication key; and if the authentication key is successfully verified, causes the network interface device to select the particular configuration of the set of functions defined in the configuration instructions of the network message.

Preferably the network interface device is further configured to pass Intelligent Platform Management Interface messages received at the network interface device to the Baseboard Management Controller.

According to a fourth aspect of the present invention there is provided a system for selecting a configuration of hardware functions of an electronic device, the system comprising:

an electronic device operable to select a configuration of its set of hardware functions; and a network interface device coupled to the electronic device and operable to cause the selection of a particular configuration of the set of functions of the electronic device in accordance with configuration instructions received at the network interface device; wherein the network interface device is configured to, on receiving a network message having one or more predetermined characteristics and comprising an authentication key and configuration instructions defining a particular configuration of the set of functions: verify the authentication key; and if the authentication key is successfully verified, cause the selection at the electronic device of the particular configuration of the set of functions defined in the configuration instructions of the network message.

Preferably the electronic device and the network interface device are both supported at a data processing system. Suitably the electronic device is a peripheral device of the data processing system, such as a display adaptor or I/O controller. Suitably the electronic device is a component of a data processing system supporting the network interface device.

Preferably the network interface device is configured to cause the selection at the electronic device of the particular configuration of the set of functions defined in the configuration instructions of the network message by storing the configuration instructions at a non-volatile memory of the network interface device optionally along with data indicating that the network interface device has configuration instructions for the electronic device.

Suitably the selection at the electronic device of the set of functions defined in the configuration instructions of the network message is performed at the instigation of a software entity supported at the data processing system attached to the network interface device.

According to a fifth aspect of the present invention there is provided a method for selecting a configuration of hardware functions of an electronic device coupled to a network interface device, the method comprising: receiving at a network interface device a network message having one or more predetermined characteristics, the network message comprising an authentication key and configuration instructions defining a particular configuration of a set of functions of an electronic device coupled to the network interface device; in response to receiving the network message, verifying the authentication key at the network interface device; and if the authentication key is successfully verified, causing the selection at the electronic device of the particular configuration of the set of functions defined in the configuration instructions of the network message.

According to a sixth aspect of the present invention there is provided a method for conducting a transaction between a vendor of a network interface device and a customer operating a data processing system supporting the network interface device, the network interface device having one or more functions which are disabled in hardware and comprising a cryptographic key, the method comprising: the customer acquiring from the vendor access to one of the said functions and providing one or more identifiers of the network interface device to the vendor; the vendor transmitting to the customer a network message comprising an authentication key and configuration instructions operable to cause the network interface device to enable one or more of the disabled functions of the network interface device; the customer allowing the authentication key and configuration instructions to pass to the network interface device over a network to which the network interface device is attached; using the cryptographic key, verifying the authentication key at the network interface device; and if the authentication key is successfully verified, causing the network interface device to enable the one or more of the disabled functions of the network interface device specified in the configuration instructions; wherein the authentication key is selected by the vendor in dependence on the identifier of the network interface device such that only the said network interface device has the cryptographic key operable to successfully verify the authentication key. The transaction may be a financial transaction. The customer may acquire access in return for monetary payment.

BRIEF DESCRIPTION OF THE DRAWINGS

The present invention will now be described by way of example with reference to the accompanying drawings, in which.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention is directed to a network interface device which has the ability to modify the set of functions it, or another device to which the network interface is coupled, can perform in response to receiving configuration instructions over the network to which it is connected. In particular, the present invention is directed to selectively enabling additional functions in devices (including network interface devices) which are capable of performing those additional functions but which have been shipped with those additional functions disabled. The network interface device is configured to verify the configuration instructions it receives by means of an authentication key included in the instructions. This allows the network interface device to be sure that the instructions originate from a trusted entity (such as a device vendor or administration server).

Figure 1:
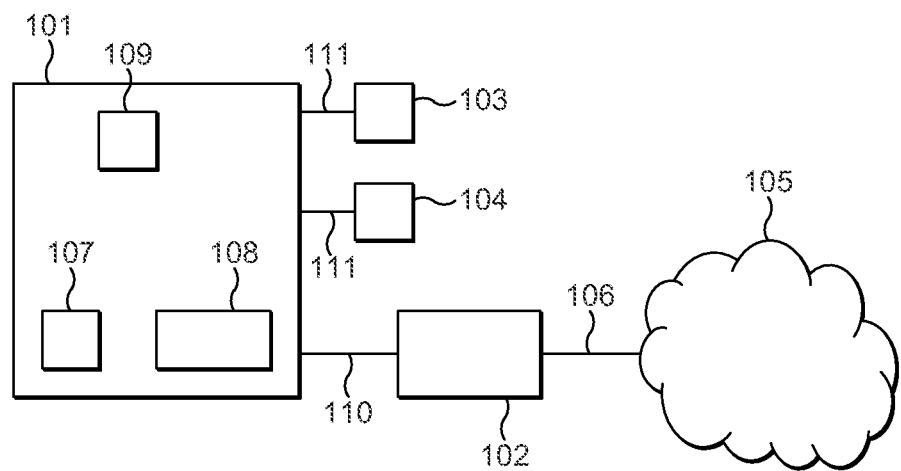
FIG. 1 is a schematic drawing of a data processing system supporting a network interface device configured in accordance with the present invention.

A schematic drawing of a system configured in accordance with the present invention is shown in FIG. 1. In the figure, network interface card or device (NIC) 102 provides an interface between network 105 and data processing system 101. Typically, NIC 102 communicates with the data processing system over bus 110 (such as a PCI, PCI-X or PCI-E bus) and is connected to the network by data link 106 (such as an Ethernet connection). The data processing system could support one or more peripheral devices 103 and 104, typically also via communication buses 111. Generally, a data processing system will include a processor 107, memory 108 and other devices 109 integral to the data processing system, such as onboard data controllers, graphics subsystems and audio subsystems.

Figure 2:
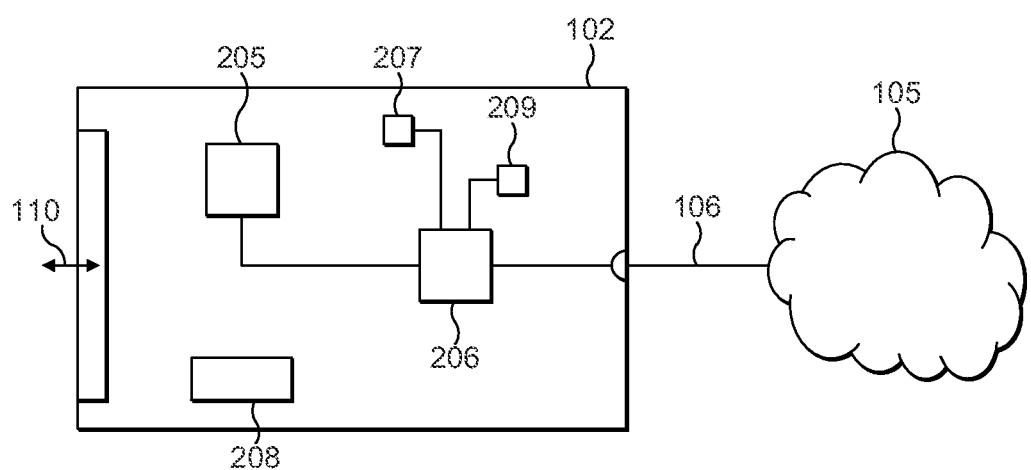
FIG. 2 is a schematic drawing of a network interface device configured in accordance with the present invention.

In a first embodiment of the present invention, network interface device 102 is operable to select the set of functions it provides in hardware in accordance with instructions received over the network. A schematic diagram of network interface device 102 is shown in FIG. 2. NIC 102 includes a processor 205, memory 208 and receive circuitry 206, although these components need not be distinct and could be combined in a single integrated circuit. The connections between the components shown in FIG. 2 are illustrative only; the components of NIC 102 may be connected in any suitable arrangement.

Figure 3:
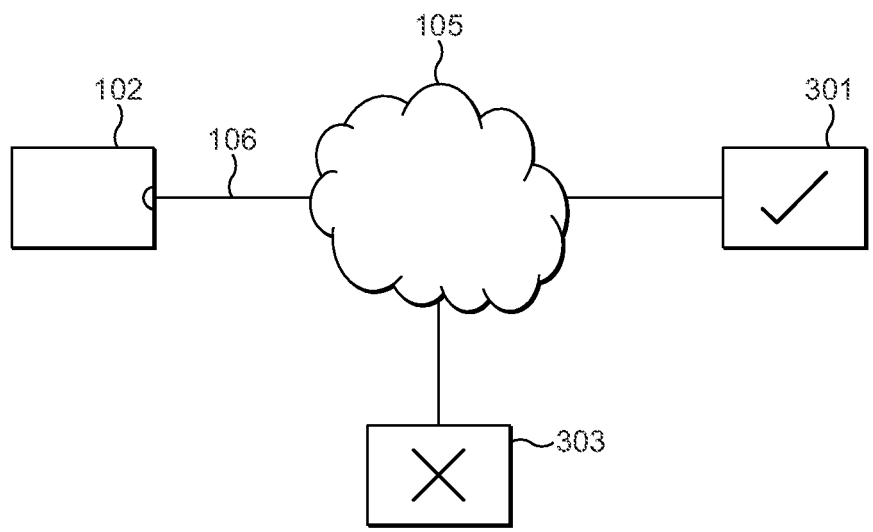
FIG. 3 is a schematic drawing of a network interface device and trusted network entity configured in accordance with the present invention.

The relationship between a network interface device 102 and trusted instructing entity 301 is illustrated in FIG. 3. NIC 102 is connected over network 105 to trusted entity 301. Trusted instructing entity 301 is configured to send configuration instructions to NIC 102 in accordance with the method described below. The NIC is only responsive to instructions received from trusted instructing entity 301 and will not process instructions received from untrusted entity 303. NIC 102 is configured to ignore any configuration instructions received from an untrusted entity, such as entity 303, because untrusted entity 303 cannot provide the necessary authentication key to NIC 102.

Trusted instructing entity 301 may be any kind of server, switch or embedded control processor (to name a few of the many possibilities). Specifically, the entity can be a program executing on such hardware. In certain situations (such as when the trusted instructing entity and target device are separated by a firewall), the trusted instructing entity may have a proxy entity accessible to the target device (e.g. behind the firewall) which mirrors the behaviour of the trusted instructing entity or relays messages from the trusted instructing entity onto the target device. This is discussed further below in relation to FIG. 4.

In a preferred embodiment, configuration instructions are communicated to the NIC in accordance with a predetermined protocol defining the format of the data exchanged between the NIC and the trusted instructing entity, and other parameters of the communication, such as the steps of a handshake used to establish communications. It is advantageous if the protocol used is a challenge-response protocol employing cryptographic authentication, such as Transport Layer Security (TLS) or Internet Protocol Security (IPsec) protocol (with the communication being secured at the transport and internet layers, respectively). However, less secure methods could be used, such as a simple secret password-based authentication method.

In order for the NIC to be able to distinguish configuration data received from a trusted entity from the general stream of data passing over data link 106, the configuration data is of a predetermined form and/or includes one or more identifiers. The receive circuitry 206 of NIC 102 is configured to detect when configuration data is received from a network entity and to cause the NIC to process the configuration data in accordance with the methods described herein. Configuration data may be identified by the receive circuitry on the basis of any suitable distinguishing characteristics, including one or more of:

1. the protocol used;
2. the structure or type of the configuration data;
3. the port number or other end-point reference to which the configuration data is directed;
4. for packet based data, one or more flags or other identifiers included in the headers of the packets in which the configuration data is carried.

Most preferably, NIC 102 is configured to receive internet protocol (IP) data packets and the configuration data comprises one or more IP data packets that include an identifier in their header to indicate to receive circuitry 206 that those data packets carry configuration data. However, in the case that the configuration instructions are received from a proxy or a server located on the local network, the packets can be Ethernet packets or an extension to a management protocol such as IPMI. This is discussed further below.

Configuration data comprises all of the data received from a trusted entity at a NIC which relates to the provision of configuration instructions to the NIC. In the preferred embodiment the configuration data therefore includes the messaging and preamble associated with establishing a connection between the NIC and trusted entity in accordance with the predetermined protocol and, if the connection is successfully established, the configuration instructions themselves.

NIC 102 is configured to only carry out those configuration instructions which can be authenticated as being received from a trusted entity. It is greatly preferable if this is the only way in which the hardware function set of the NIC can be modified. The configuration data therefore includes (at some point in the communications between the NIC and trusted entity) an authentication key from the entity sending the configuration instructions to indicate to the NIC that the entity is indeed trusted entity 301. The authentication key could be a password, a security certificate, a pseudorandom number (for which the NIC understands the generator sequence) or a hash of a set of predetermined data (such as a secret word known to the NIC, a timecode, an identifier of the trusted entity, etc.). In the case in which the configuration instructions are encrypted, the authentication key can be the encrypted instructions themselves, with the authentication key being successfully verified if the instructions are successfully decrypted. The instructions preferably include a verifiable checksum or hash so that the network interface device can determine whether the configuration instructions have been successfully decrypted.

It is further preferable that communications between the NIC are established over a secure channel. For typical packet-based data streams, this has the advantage that man-in-the-middle attacks are much more difficult because the NIC can be sure that all of the packets came from the same entity. Authentication, verification and decryption/encryption functions can be performed at a state machine or processor located at the network interface device.

In the preferred embodiment, the trusted entity holds a private key and the NIC holds a public key, the two keys together belonging to a cryptographic pair. The keys can be used to establish a secure communication channel between the NIC and trusted entity and to encrypt data communicated over that channel. Suitable protocols are known in the art (e.g. TLS and IPsec). The preferred embodiment is based on the principle that the trusted entity keeps the private key secret and therefore any authentication keys generated by that key or any data encrypted using that key must have originated at the trusted entity. The public key of the pair which is stored at the NIC can be used to verify an authentication key generated using the private key or decrypt data encrypted by the private key (or a derivative thereof). Thus, the NIC can be sure that the configuration instructions originated at the trusted entity and the trusted entity can be sure that only the intended NIC with the correct public key can use the configuration instructions.

Alternatively, the private key could be stored at the NIC and the public key stored at the trusted entity but this is not preferred because a typical vendor will ship their NICs to customers all over the world, giving malicious parties the opportunity to examine a NIC and potentially (although unlikely) to extract its key. Furthermore, having the public key at the NIC allows there to be fewer private keys (perhaps only one) than there are public keys, with each public key being able to decrypt data encrypted by the group of private keys or their derivatives. Thus the private key(s) must be physically secure. This architecture makes it very difficult for a party to modify the function set of a single NIC, and almost impossible to modify the function set of many NICs (as would be present in a corporate network).

On initiation of a secure channel between the NIC and the trusted entity, the trusted entity transmits a message to NIC 102 indicating that it wants to send configuration instructions to the NIC. It can be advantageous if the NIC can decline the request. This can be useful in cases in which the NIC is supporting other communication channels and would be required to drop those channels in order to process the configuration instructions, or the NIC could be configured to decline requests which are sent between predetermined hours or on predetermined days. If the NIC accepts the request, the NIC and trusted entity may optionally establish a secure encrypted connection between themselves (preferably secured using the private key held at the trusted entity and the public key held at the NIC). Alternatively, the trusted entity can transmit the configuration instructions to a proxy entity local to the network interface device according to this scheme and the proxy can then appropriately schedule the application of the configuration update. It is advantageous if the proxy has its own cryptographic key with which it can verify configuration instructions received from the trusted entity/set up a secure connection between the trusted and proxy entities. This cryptographic key may be generated by the trusted entity in the manner described below.

Once a connection is established with the target NIC or proxy, the trusted entity transmits the configuration instructions to the NIC/proxy entity (as appropriate), preferably in encrypted form. If the proxy receives the configuration instructions and authentication key, it may store them for later application to the NIC as part of a scheduled update. Once the NIC receives the configuration instructions and authentication key (possibly via the proxy), the NIC verifies the authentication key and updates its function set in accordance with the configuration instructions. Following the updating of the NIC's function set, a message may be transmitted to the trusted entity to indicate that the configuration instructions were successfully applied.

The NIC may optionally include a Trusted Platform Module (TPM) 207 in accordance with the specification published by the Trusted Computing Group (TCG). The TPM could be used to store the public key assigned to the NIC. Alternatively, a TPM could be present in data processing system 101, with the NIC being capable of querying the system TPM in order to use the stored public key.

Instead of storing an additional public key at TPM 207, the endorsement key of the TPM could be used to authenticate the identity of the NIC in accordance with the TCG specification and additional information could be stored in the TPM memory to allow the NIC to authenticate the identity of the trusted entity. The information could include a hash derived from the cryptographic key held by the trusted entity, parameters for generating a pseudorandom number sequence used by the trusted entity, etc. The trusted entity could provide a security certificate issued by a certificate authority to authenticate its identity, as is well known in the art.

In alternative simplified embodiments, the trusted entity transmits configuration instructions along with an authentication key to the NIC without first establishing a connection between the two. The authentication key can be a cryptographic hash or digital certificate (or in any other form described in the embodiments above) which is generated using a private key held at the trusted entity, with the NIC having a public key which is used to validate the authentication key. In addition, or alternatively, the configuration instructions could be encrypted at the trusted entity using its private key, with the public key at the NIC being used to decrypt (and therefore also validate) the configuration instructions. In such embodiments it is advantageous if the NIC indicates to the trusted entity whether it will accept the instructions and/or whether the instructions have been successfully applied. The same considerations apply with regard to the detection of configuration data at the receive circuitry of the NIC.

On receiving a set of valid configuration instructions from a trusted entity whose identity has been validated, the NIC performs the instructions of the set or writes the instructions to a memory (preferably to the non-volatile memory of the NIC 208 or a memory of the data processing system 108) for the instructions to be later applied by the NIC or a software, firmware or hardware entity of data processing system 101. Preferably, the NIC stores the received configuration instructions in its non-volatile state memory 208 and then enters a configuration mode in which the NIC can safely apply the configuration instructions.

NIC 102 provides a set of functions defined in hardware and/or firmware (such as data throughput, half or full-duplex operation, Wake-on-LAN functionality, etc.), one or more of which can be enabled or disabled by the NIC. The functions of the NIC can be enabled or disabled by one or more of: changing the state of one or more hardware switches, modifying entries in a hardware register or function table defining the functions the NIC can perform, and updating firmware stored at the NIC. In this manner the set of functions provided at the NIC can be modified.

In a simple example, one or more hardware switches could be used to switch on and off portions of circuitry which provide additional functions at the NIC: if the circuitry is switched on, the additional functions are enabled; if the circuitry is switched off, the functions are disabled. In a second example, one or more switches are used to select between different modes or clock speeds. In a third example, the values written to a hardware register determine the set of functions active at the NIC: on boot-up the hardware consults the entries in the register and operates with the function set indicated therein.

The present invention provides a secure method by which the function set of a network interface device can be remotely selected. This method addresses the problems identified in the prior art and has several useful applications.

The function set of the NIC can comprise any number of different functions, including:

1. The virtual network interfaces presented by the NIC—in particular, the PCIe physical functions, IOV virtual functions and parameters such as the degree of Receive Side Scaling (RSS). The function set of the NIC could include the parameters of any of these interfaces, allowing the configuration of the interfaces presented by the NIC to be configured in accordance with the mechanisms of the present invention.

2. Quality of Service (QoS) functions—in particular, traffic shaping algorithms, peak and reserved bandwidths, and parameters described which data streams or types are to be given priority, 3. The network parameters of the NIC, such as IP address and maximum transmission unit (MTU) size, virtual LAN (VLAN) identifiers.

4. Network state associations: for example, it is advantageous if the NIC can store the state for the connections of a particular guest operating system in a virtualised system such that if the guest OS migrates between servers the state can be transferred to the NIC of that server.

In a first example, trusted entity 301 is operated by the vendor of NIC 201 so as to allow remote unlocking of functions which are disabled in hardware at the NIC. The public key is written to the NIC by the vendor during manufacture of the NIC, with the vendor holding the private key of the cryptographic pair. Preferably the public key is written to "tamper-proof" write-once memory. If the vendor of the NIC is the trusted entity, the vendor can arrange that the NIC does not carry out configuration instructions unless they are verified as originating from the vendor (the carrier of the private key). This is beneficial for both vendor and end-user: because only the vendor can modify the set of functions which the NIC is enabled to perform, the vendor can charge for enabling additional functions of the NIC (by way of a financial transaction), and the end-user can be confident that the NIC is secure from attempts by untrusted third parties to modify the function set of the NIC.

In a second example, a NIC allows a public key to be written to it so as to allow the party writing the key to remotely manage the functions set accessible at the NIC. Thus a system administrator holding the private key of the pair could securely manage a group of computers having NICs configured in accordance with the present invention and loaded with a predetermined public key. This allows a system administrator to remotely control the set of functions provided in hardware at each NIC on the administrator's network.

A network interface device as described above can be further configured to set the function set of another device which is enabled to receive configuration instructions. The other device may be any device local to NIC 102, such as an onboard I/O controller 109 supported at data processing system 101, the data processing system 101 itself, or a peripheral device 103 or 104. The NIC may be coupled to the device via a data bus of the data processing system or any kind of direct interconnect. NIC 102 receives configuration instructions from a trusted entity according to the method described herein and is configured to cause those configuration instructions to be applied to another device operable to use them. A NIC configured to apply configuration instructions to another device need not be operable to modify its own function set in accordance with received configuration instructions.

Optionally, instead of using the public key stored at the NIC, the NIC can use a public key stored at the target device to which the configuration instructions are directed to secure communications between the trusted entity and the NIC. However, it is preferable that the NIC uses its public key to secure communications between it and the trusted entity, and the target device or a software entity at data processing system 101 then performs decryption or validation of the received configuration instructions before modifying the function set of the target device.

A NIC operable to cause the function set of another device to be updated must know to which device a set of received configuration instructions are targeted. This may be indicated to the NIC in the configuration data transmitted to it from a trusted entity. For example, on establishing a secure connection to the NIC, the trusted entity could signal to the NIC which device of the system the trusted entity wishes to update. This allows the NIC to optionally check for the presence of the device and query the device in order to determine whether the target device can receive the configuration instructions at that time. Alternatively, the configuration instructions themselves can indicate the device to which they are directed. Preferably the NIC stores the identity of each of the devices in the local system which are operable to have their function set updated in accordance with the present invention. The device identities may be entered by the manufacturer or system administrator on installing the NIC in the local system.

On receiving a set of configuration instructions for another device, the NIC can be configured to handle the instructions in one of two ways (the NIC may have the ability to perform only one of the two options or it may be able to use either option in dependence on whether or not the NIC can directly address the target device). As a first option, the NIC transmits the configuration instructions to the target device and the target device updates its function set accordingly. As a second option, the NIC stores the configuration instructions for the other device in its memory 208 or in a memory 108 of the data processing system to which it is attached. This allows the NIC to apply configuration instructions to devices which it cannot access without cooperation from data processing system 101 (for example, devices on other buses), or to devices which are not switched on or connected to the NIC/data processing system at the time the configuration instructions are received (such as wireless printers or external storage).

In support of the second option, the NIC may receive the configuration instructions when the data processing system is in a low power state (e.g. switched off or in standby or hibernation mode) and therefore in some circumstances cannot communicate with the target device of the system. However, whether the first or second option is adopted, this problem can be solved by either allowing the NIC to wake the target device or an intervening data bus, or causing the configuration instructions to be processed the next time the system as a whole enters a higher power state when the target device is accessible.

Generally, the NIC can either (a) apply the configuration instructions to a target device itself, or (b) cause the data processing system or a software entity supported at the data processing system to apply the configuration instructions to a target device. Note that the NIC may be a peripheral device in the target system or the NIC could be supported at the mainboard of the system.

As described above, the application of configuration instructions to a device configured in accordance with the present invention comprises enabling or disabling hardware functionality and/or firmware functions by one or more of:
 1. setting one or more hardware switches;
 2. writing to a hardware register or configuration table;
 3. writing a new firmware to the device.

Configuration instructions stored at a memory of the NIC or data processing system could be applied to the target device in several ways. An application, component of the operating system, or firmware stored at the data processing system (such as the BIOS) could pick up the stored configuration instructions and apply them to the target device (which could be the NIC) at a suitable time. For example, this could occur during boot-up of the data processing system or at the initiation of a system administrator (perhaps from a remote computer). Preferably the NIC can indicate to the data processing system that configuration instructions have been received so as to alert the appropriate functionality of the operating system, an application or the BIOS that a set of configuration instructions are ready to be applied. This could be by means of a flag or other identifier set at the NIC, or the presence of the configuration instructions in memory could itself be sufficient.

In order to apply received configuration instructions, the NIC or other target device may be required to enter a configuration mode in which the NIC or other target device can safely update its function set. In such a configuration mode, the NIC/other device may be unresponsive to all communications and stop performing its normal functions. This allows the NIC/device minimise the risk of rendering itself inoperable as a result of enabling or disabling functions in hardware, updating its firmware etc.

The network interface device 102 has been described above as an interface card for a data processing system 101, such as a desktop, laptop computer or server. However, network interface device 102 could be any kind of network interface configured in accordance with the present invention and could be a communication interface of, for example, a switch, a router, a printer, a handheld multimedia device or a portable telephone. NIC 102 could be a wired or wireless network interface.

In order to deal with the situation in which the data processing system supporting the target NIC is in a low power state, it is advantageous for the data processing system and NIC to support at least some of the operations of the present invention in the low power state. Most preferably the NIC is configured to be operable to receive configuration instructions in a low power state and this is the preferred mode in which configuration instructions are received and applied in a system configured in accordance with the present invention. This allows configuration changes to be effected when the target system is not being used, or at a time selected by the system administrator. Alternatively, the trusted entity can transmit management or Wake-on-LAN packets to the target system so as to cause the target system to at least raise its power state (or that of a target device) such that the configuration instructions can be received and applied. This may be required in certain circumstances—for example, if configuration instructions are received for a device which is powered down.

For example, a target system supporting a NIC in accordance with the present invention might include a low power management subsystem that is active in the low power state. Typically such a system would include a Baseboard Management Controller (BMC) 112, with the NIC being configured to filter incoming data packets and deliver those packets recognized as carrying instructions for the BMC to the BMC. Typically, these will be packets of the Intelligent Platform Management Interface (IPMI) and the NIC will pass them to BMC 112 using the Network Controller Sideband Interface (NC-SI). The filtering and delivery of such packets does not involve the CPU or main I/O bus of the data processing and is confined to the low power management subsystem and NIC.

In an embodiment of the present invention, the NIC is configured to support additional management packets to the set of packets of a management protocol (such as IPMI packets) supported by the system. This is preferably implemented at the NIC by configuring an extended set of filters at receive circuitry 206 to trap the additional management packets (as well as the regular packets of the management protocol), even when the data processing system and network interface device are in a low power state. The management packets are passed by the NIC to the management controller of the system (the BMC) and either the NIC or the BMC can be configured to handle the verification and configuration steps of the present invention.

If the NIC is configured to handle packets carrying configuration instructions and the necessary authentication keys, this is preferably performed at its own internal management controller (MC) 209. Thus, the present invention can utilise a sideband management subsystem to allow configuration instructions to be transmitted to the target system when the target system is in a low power state.

Alternatively, the management circuitry (BMC) of the system is configured to perform the authentication and processing of the configuration instructions, with the command set recognised by the BMC being extended to include the commands carried in the additional management packets. The authentication of received authentication keys may be performed with the support of a Trusted Platform Module of the data processing system, as discussed above. The NIC need only perform the filtering (interception) of packets directed to the BMC (which includes packets carrying configuration instructions) and pass those packets (or their contents) onto the BMC which performs all other aspects of the present invention (such as verification etc.). The BMC is configured to cause successfully verified configuration instructions to be applied to the network interface device—in other words, the network interface device is operable to receive configuration instructions from the BMC and configure itself in accordance with those instructions. In this particular embodiment, the BMC can store a cryptographic key for one or more devices of the system and the BMC is able to effect the modification of hardware functionality at one or more devices of the system.

At its most straightforward, the present invention could operate with a basic Wake on LAN (WoL) architecture, with the trusted entity transmitting a WoL "magic packet" to the NIC prior to sending configuration instructions. If the NIC is in a low power state, the magic packet triggers the NIC to wake the I/O bus and main processor of the target system 101.

It is advantageous for the trusted entity to be configured to query the target system in order to determine whether it is in a low power state. If the target system is found to be in a low power state the trusted entity can message the BMC/send a magic packet (as appropriate) in order to move the target system to the required power state in which configuration instructions can be applied.

Since the trusted entity may be outside the network that includes the target NIC, accessible only via the internet, the administrator of the network that includes the target NIC may be required to configure a virtual private network (VPN) between the trusted entity and the target NIC so as to allow the management messages/magic packet to reach the NIC. Alternatively, and as mentioned above, there may instead be a proxy server or program running on a server local to the target machine which connects to the trusted entity (preferably securely, such as over an SSL encrypted connection).

Figure 4:
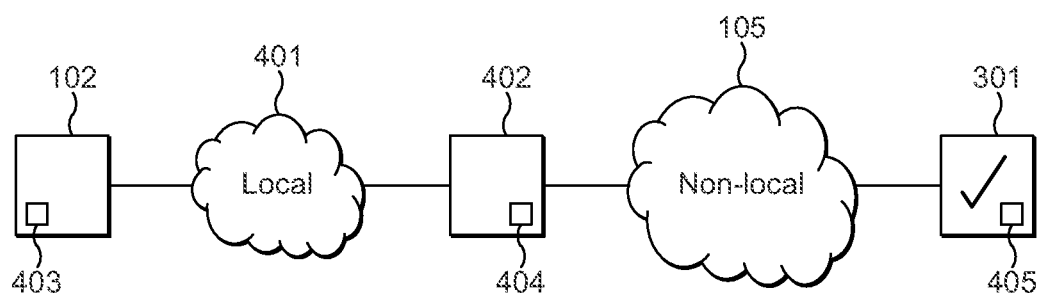
FIG. 4 is a schematic drawing of a network interface device, trusted network entity and intervening proxy network entity configured in accordance with the present invention.

The use of a proxy is shown in FIG. 4. Proxy trusted entity 402 is accessible to NIC 102 over local network 401 (which could be a corporate network). Proxy trusted entity 402 is also accessible to trusted entity 301 over non-local network 105 (which could be the internet). The proxy entity is operable to receive configuration instructions for the target NIC 102 from trusted entity 301 in accordance with any of the authentication/encryption methods described above. In turn, target NIC 102 is operable to receive those configuration instructions from the proxy. Since the proxy is local to NIC 102, it can transmit management packets to the NIC, which allows (in accordance with the preferred embodiment) the configuration instructions to be transmitted to the NIC in one or more management packets. As discussed above, the management packets are preferably defined in an extension of a known management protocol (such as IPMI) utilised at the target system.

Trusted entity 301 and proxy trusted entity 402 preferably include cryptographic keys 405 and 404, respectively. Cryptographic key 405 is used to authenticate configuration instructions sent proxy the trusted entity. Cryptographic key 404 is used to authenticate the proxy to NIC 102 and can also be used to authenticate configuration instructions which originate at the proxy (for example, instructions which are used to configure the NIC but do not modify the hardware functions of the NIC). In the case in which configuration instructions originate from proxy entity 402, the proxy is a trusted entity in its own right, although typically of a lower privilege level, and the proxy uses its cryptographic key to generate the authentication keys it provides with its configuration instructions.

In the preferred embodiment, cryptographic keys 404 and 405 are both generated from a private key held by the trusted entity, and NIC 102 may include one or more public keys which correspond to the authentication keys sent by the trusted/proxy entities. However, various other arrangements are envisaged and will be apparent to a person of skill in the art.

It is further preferred that trusted entity 301 can determine the privilege level of other network entities. For example, the trusted entity can be configured to generate an authentication or public key for another entity (such as a proxy entity or management server local to the target NIC) which gives the holder of that key configuration rights up to a particular privilege level. Thus, configuration instructions sent along with that authentication key (or an authentication key generated using the public key) may only configure those predetermined functions over which that privilege level has control. Functions which are only configurable by network entities having a higher privilege level cannot be modified by the network entities having a lower privilege level. An authentication key may indicate to a target NIC that the originating network entity has a particular privilege level by one of several mechanisms, including:

i. the authentication key corresponds to a public key stored at the NIC having a predetermined privilege level;

ii. the authentication key includes a privilege level indicator signed by the trusted entity which indicates the privilege level of the holder of that authentication key.

There are advantages to using a proxy server in order to mediate the transaction between the trusted entity and the target machine. In particular, the use of a proxy allows configuration instructions to be delivered to the target machine asynchronously (i.e. the target machine does not require a live connection to the trusted entity). For example, the proxy can connect to the trusted entity in order to download the configuration instructions for one or more target devices on the network and then store those devices until a later time, such as during an update cycle or overnight when the target machines are in a low power state. In alternative embodiments, the proxy could allow the configuration instructions to be written to a bootable disc or portable drive, such as a USB memory stick, which can be used to supply the configuration instructions to the target machine. The configuration instructions can be delivered to the proxy as a message having, very generally, the form:

private-key-encrypt {machine with serial number in range [X-Y], add NIC capability [Z]}

A first exemplary application of the present invention will now be described. NIC 102 is a gigabit Ethernet device capable of operating at 1 Gbps or 10 Gbps and which of these two functions the NIC is configured to perform may be selected in hardware. In accordance with the present invention, a public cryptographic key is written to the NIC by the vendor during manufacture and the choice of either 1 Gbps or 10 Gbps functionality is selected. Only the vendor can set the functions of the NIC in hardware. The private key of the cryptographic pair is held by the vendor.

A customer purchases the 1 Gbps version of the NIC, which is sold at a lower price than the 10 Gbps version. However, at a later time, the customer wants to upgrade their NIC to support the 10 Gbps function. Conventionally, such an upgrade would require the customer to purchase a new NIC, or return the NIC to the vendor to allow the 10 Gbps function to be selected in hardware. The present invention allows the vendor to remotely select the function set offered by the NIC. In order to receive the upgrade, the customer contacts the vendor, pays an upgrade fee and provides sufficient information for the trusted entity provided by the vendor to address the NIC over the relevant networks (which may include the Internet). The trusted entity of the vendor then, in accordance with the teaching described herein, transmits the appropriate configuration instructions to the NIC so as to cause the NIC to enable the 10 Gbps function.

A second exemplary application of the present invention will now be described. Consider a data processing system supporting a display device 103 and network interface device 102 both configured in accordance with the present invention. Display device 102 comprises a 3-D graphics processor having 64 texture units and supporting a maximum clock speed of 750 MHz. However, these functions of the graphics processor can be configured at a hardware register of the display device, with the number of texture units being selectable between 16, 32 and 64, and the clock speed being selectable between 450, 650 and 750 MHz. The firmware of the display device may be updated to reflect the enabled functions of the device.

When the end-user of the data processing system supporting the display device purchased the system, they only paid for a display device having 32 texture units enabled and a 650 MHz clock speed. At some later date the end-user wishes to pay to enable the full functionality of the display device so as to allow the system to support the latest videogames. Because the data processing system includes a NIC configured in accordance with the present invention, the end-user can purchase the additional functionality from the appropriate vendor and have the new function set applied remotely to their display device by means of the NIC.

A third exemplary application of the present invention will now be described. During assembly of a data processing system 101 such as a desktop computer, laptop computer, or server, a network interface device 102 configured in accordance with the present invention is installed in the data processing system. One or more of the other devices present in the data processing system (such as graphics cards, I/O controllers etc.) are operable to have their function sets updated according to the method described above. Thus, the data processing system comprises one or more devices (this may or may not include the NIC itself) whose function sets may be determined in hardware and/or firmware and a NIC 102 operable to configure those function sets by means of communication over a network with a trusted entity.

Conventionally, a data processing system is assembled from a selection of pre-configured hardware devices which match the specification ordered by the customer. Thus, each of the hardware devices is pre-loaded with the appropriate firmware and the hardware functions provided by each device are either non-configurable or preset by the manufacturer of each device. The manufacturer of the data processing system must therefore keep stocks of all of the devices in all of the configurations offered to their customers. This can be inefficient when different versions of the same product differ only in the set of functions which are enabled in hardware. Furthermore, even in cases in which the manufacturer of the data processing system can enable or disable hardware functions and update the firmware of the devices of the system, conventional methods for performing these tasks require specialist tools and must be performed on a device-by-device basis.

The present invention provides a convenient method by which the manufacturer of a data processing system can quickly and easily enable or disable hardware functions and update the firmware of the devices of a newly-built system using the configuration functionality of NIC 102. Once the data processing system has been assembled, the manufacturer can connect the NIC to a trusted entity (this could be by means of a simple Ethernet patch cable) and the configuration instructions for all of the devices of the system which are enabled to receive configuration instructions (and which require configuring) can be downloaded to the NIC. The configuration instructions are then be applied to each of the respective devices in accordance with the teachings described herein. This allows the function sets of the devices in the system to be configured to match the specification ordered by the customer:

This is best illustrated by way of an example. Consider customers X and Y who each purchase a data processing system having identical hardware but customer Y pays a premium over customer X for additional functions to be enabled in the hardware of their data processing system. Customer X receives a system having a graphics processor which has only 32 texture units enabled and an Ethernet NIC supporting 1 Gbps throughput. Customer Y receives a system having a graphics processor which has all 64 texture units present in the hardware enabled and an Ethernet NIC supporting 10 Gbps throughput. The firmware of the graphics and network card devices in customer Y's data processing system are also updated to support the additional functions.

It is advantageous for a device configured in accordance with the present invention to store multiple public keys. For example:

1. The device manufacturer's public key;
2. The public key of the OEM that built the system comprising the device;
3. The public key of the customer.

Each type (1 to 3) of public key may correspond to a different level of authority and hence a different set of device capabilities which can be modified. For instance, providing a pair to the key at the device manufacturer's level would allow access to all configurable functions of the device, whereas providing a pair to the key at the OEM level would allow access to a subset of those functions over which the OEM has been given control (perhaps by means of a licensing agreement between the device manufacturer and the OEM). Providing a pair to the key at the customer level would yield the least control over the functions of the device—this can provide a mechanism by which the device can be configured by the customer, or perhaps the customer is permitted to disable, but not enable, functions in hardware. Accordingly, the "trusted entity" referred to herein can be a machine of the device manufacturer, OEM or customer, as appropriate to the situation.

A fourth exemplary application of the present invention will now be described. Consider a NIC at a data processing system on a corporate network which also includes a trusted entity which may or may not be able to act as a proxy for a trusted entity operated by a device manufacturer/OEM external to the corporate network. The trusted entity may not be local to the data processing system—for example, the corporate network could be split across several sites. The NIC has stored a public key for the corporation which corresponds to a private key stored at the trusted entity. The data processing system is virtualised with several guest operating systems running on the system atop a hypervisor. The NIC supports a virtual NIC for each of the guest operating systems.

Now suppose the administrator of the system (which is, for example, a server in a datacenter) wishes to create a new virtual NIC (VNIC) for a new guest operating system which has been created on said data processing system. The system administrator causes the trusted entity to transmit configuration instructions to the NIC of the target system which instruct the NIC to create the new VNIC. The NIC can then transmit an event to its device driver so as to cause the hypervisor to pick up the new VNIC and map it into the new guest operating system (the hypervisor can be messaged by conventional means in order to configure the new guest operating system and instruct the hypervisor to correctly map the new VNIC). In this manner, the present invention can be used to securely and remotely configure a NIC at a low level.

In preferred embodiments of the invention, the network interface device or other electronic device (such as a peripheral device for a computer system) is shipped by the manufacturer with some of the set of functions of the device disabled such that the disabled functions are not available for use at the device. The device is capable of performing the disabled functions (i.e. it includes the necessary hardware and optionally the necessary firmware/software) but those functions are disabled by the vendor of the device such that the functions cannot be enabled unless a valid authentication key is received by the device. Thus, a disabled function is a function that the hardware of the device is capable of performing but that is not available for use at the device whilst the function is disabled. In some embodiments it might be necessary to update the firmware/software of the device to support a particular function when that function is enabled at the device by means of the method of the present invention.

Furthermore, in preferred embodiments of the invention, the information necessary to verify an authentication key received at the device is stored integral to the device during manufacture, or at least prior to sale of the device. The information could be stored at a trusted platform module (TPM) of the device. Most preferably the cryptographic information required to verify configuration instructions received at the device is stored at the device in such a way that it cannot be edited or overwritten (e.g. the cryptographic information is stored in a "write-once" memory), or the cryptographic information is stored in a tamper-proof memory such that any attempts to perform one or more of (a) editing, (b) overwriting or (c) directly reading the cryptographic information prevent the device from enabling any disabled functions (or alternatively, the device could render itself inoperable until "unlocked" by the vendor). In this manner, the vendor can ensure that only they can enable those functions of the device that are disabled when the product is sold, allowing the vendor to charge for enabling those additional functions.

Thus, in preferred embodiments of the present invention a network interface device includes one or more functions disabled in hardware in a second mode, the network interface device being operable to enable disabled functions in accordance with configuration instructions received at the network interface device, and the network interface device being configured to, on receiving a network message comprising an authentication key and configuration instructions defining one or more hardware functions of the network interface device that are to be enabled, verify the authentication key as being valid by means of cryptographic information stored at the network interface device and, if the authentication key is successfully verified, enable the one or more functions defined in the configuration instructions of the network message. The network message is received over a network to which the network interface device provides an interface. The cryptographic information is preferably stored at the network interface device during manufacture and could be a cryptographic key or other data by means of which an authentication key can be verified as being valid—i.e. as being from a trusted source allowed to enable disabled functions of the network interface device.

A network interface device (NIC) configured in accordance with the present invention could be operable to enable one or more of the following functions that are disabled during manufacture:

a) Increased link speed. Such a device may be shipped in a default state in which the maximum link speed of the device is limited to a first speed (e.g. 10 Gbps) but the hardware of the device can in fact support a greater second link speed (e.g. 40 Gbps)—in other words, the greater second link speed is disabled at the device. On enabling the greater second link speed function, the maximum link speed at which the device can operate increases up to the second link speed.

b) Full duplex operation. Such a device may be shipped in a default state in which the device supports only half-duplex communications over its physical ports. On enabling the device's full duplex function, the device supports full-duplex communications over its physical ports.

c) Hardware support for an increased number of virtualised NICs. Such a device may be shipped in a default state in which the number of VNICs the device can support is limited at the device—in other words, some of the potential VNICs (or the physical resources associated with those VNICs) of the PCIe device are disabled.

d) Hardware support for an increased number of PCIe physical or virtual functions. Such a device may be shipped in a default state in which the number of PCIe physical and/or virtual functions of a PCIe NIC is limited at the device—in other words, some of the potential physical and/or virtual functions (or the physical resources associated with those functions) of the PCIe device are disabled. On enabling additional PCIe physical and/or virtual functions, the device makes additional PCIe physical and/or virtual functions available for use.

e) A TCP Offload Engine (TOE). Such a device may be shipped in a default state in which the TCP Offload Engine is disabled such that the device does not support TCP offload processing at the device, although it includes the hardware necessary to perform such processing.

On enabling the TCP Offload Engine, the device supports TCP offload processing and is operable to perform such processing.

f) Additional physical ports. Such a device may be shipped in a default state in which only a subset of the total number of the physical ports of the device are enabled, with the remaining number being disabled. On enabling one or more of the disabled ports, the newly-enabled ports become available for use at the device so as to allow the device to communicate data over networks connected to the newly-enabled ports.

The term "network interface device" as used herein is a hardware controller operable to provide an interface between a data network and a data processing system. The controller (or NIC) may be embodied as a peripheral card of a data processing system or could be an embedded component of a data processing system, such as a server, router or switch device.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

We claim:

1. A network interface device providing a set of virtual network interfaces, comprising:
   one or more physical network ports and being configured to communicate with a data processing system via an internal physical data bus, and
   the network interface device configured to, on receiving a network message having one or more predetermined characteristics and comprising an authentication key and configuration instructions defining a new virtual network interface:
   verify the authentication key; and
   when the authentication key is successfully verified, create the new virtual network interface defined in the configuration instructions of the network message,
   wherein the virtualized data processing system is configured further to run a plurality of quest operating systems running atop a hypervisor, the network interface device being configured to support a different virtual network interface for each of the plurality of guest operating systems,
   and wherein the network interface device is configured to, in conjunction with creating the new virtual network interface defined in the configuration instructions, via a network interface device driver of the network interface device, message the hypervisor to map the new virtual network interface into a new guest operating system created at the data processing system.

2. The network interface device as claimed in claim 1, wherein said configuration instructions further comprise modifying the parameters of a virtual network interface of the set.

3. The network interface device as claimed in claim 1, wherein the network interface device is configured to effect the creation of the new virtual network interface by writing values to a hardware register or non-volatile state memory of the network interface device.

4. The network interface device as claimed in claim 1, wherein the network message comprises one or more data packets received in accordance with a predetermined messaging protocol.

5. The network interface device as claimed in claim 4, wherein the protocol is the Intelligent Platform Management Interface protocol, or an extension thereof.

6. The network interface device as claimed in claim 1, wherein the one or more predetermined characteristics include one or more of:
   (a) a predetermined identifier in the headers of at least some of the data packets which together comprise the network message;
   (b) a predetermined pattern of data in the network message; and
   (c) address information in the network message identifying the endpoint to which the message is directed such as IP address and/or port number.

7. The network interface device as claimed in claim 1, wherein the configuration instructions are encrypted and the authentication key is the encrypted configuration instructions.

8. The network interface device as claimed in claim 7, wherein the network interface device is configured to verify the authentication key by decrypting the encrypted configuration instructions, the authentication key being successfully verified if the encrypted configuration instructions are successfully decrypted.

9. The network interface device as claimed in claim 1, wherein the authentication key is one of a password, a cryptographically-signed certificate, a pseudorandom number or a hash of a set of predetermined data.

10. The network interface device as claimed in claim 1, wherein the network interface device is configured to verify the authentication key in accordance with the Transport Layer Security (TLS) protocol or Internet Protocol Security (IPsec) protocol.

11. The network interface device as claimed in claim 1, wherein the network message is received from a local network entity and the configuration instructions comprised in said network message originate at a remote network entity, the local network entity being a proxy for the remote network entity.

12. The network interface device as claimed in claim 1, wherein there exists a cryptographic pair of keys and the authentication key is generated using a private cryptographic key of the pair.

13. The network interface device as claimed in claim 12, wherein a public cryptographic key of the pair is stored at the network interface device and the network interface device is configured to verify the authentication key using the public key.

14. The network interface device as claimed in claim 12, wherein the network interface device is configured to use a public cryptographic key of the pair to establish an encrypted channel over which the network message is received.

15. The network interface device as claimed in claim 12, wherein the cryptographic key of the pair is stored at a network entity from which the configuration instructions originate, the said network entity being configured to generate the authentication key and transmit the authentication key and configuration instructions to the network interface device.

16. The network interface device as claimed in claim 15, wherein the network entity is accessible to the network interface device over the internet.

17. The network interface device as claimed in claim 12, wherein the network interface device includes a Trusted Platform Module and the Trusted Platform Module holds a public cryptographic key of the pair.

18. The network interface device as claimed in claim 14, wherein the network interface device includes a Trusted Platform Module and an endorsement key of the Trusted Platform Module is used to establish the encrypted channel.

19. The network interface device as claimed in claim 14, wherein the encrypted channel is established in accordance with the Transport Layer Security (TLS) protocol or Internet Protocol Security (IPsec) protocol.

20. The network interface device as claimed in claim 1, wherein the network interface device is configured to verify the authentication key at a state machine or processor of the network interface device.

21. The network interface device as claimed in claim 1, wherein the network interface device is configured to accept the network message in a low power state.

22. The network interface device as claimed in claim 21, wherein the network interface device further comprises a management controller configured to perform said verification of the configuration instructions and cause the creation of the new virtual network interface defined in the configuration instructions, the management controller being active in the low power state.

23. The network interface device as claimed in claim 1, wherein the data processing system comprises a Baseboard Management Controller and the network interface device is configured to pass Intelligent Platform Management Interface messages received at the network interface device to the Baseboard Management Controller.

24. The network interface device as claimed in claim 23, configured to, on creating the new virtual network defined in the configuration instructions, message the Baseboard Management Controller to indicate that the set of virtual network interfaces has changed.

25. The network interface device as claimed in claim 1, further comprising a non-volatile memory and being configured to store the received configuration instructions in said memory and at a later time to perform the creation of the new virtual network interface defined in the configuration instructions of the network message at the instigation of a software entity supported at the data processing system.

26. The network interface device as claimed in claim 1, wherein the network interface device is configured to successfully verify at least two different authentication keys including a first authentication key and a second authentication key, the second authentication key having a lower privilege level than the first authentication key.

27. A method configuring a network interface device providing a set of virtual network interfaces, the method comprising:
receiving at a network interface device a network message having one or more predetermined characteristics, the network message comprising an authentication key and configuration instructions defining a new virtual network, wherein the network interface device has one or more physical network ports and is configured to communicate with a data processing system via an internal physical data bus;
in response to receiving the network message, verifying the authentication key at the network interface device; and
when the authentication key is successfully verified, creating the new virtual network interface defined in the configuration instructions of the network message,
wherein the virtualized data processing system is configured further to run a plurality of guest operating systems running atop a hypervisor, the network interface device being configured to support a different virtual network interface for each of the plurality of guest operating systems,
and wherein the network interface device is configured to, in conjunction with creating the new virtual network interface defined in the configuration instructions, via a network interface device driver of the network interface device, message the hypervisor to map the new virtual network interface into a new guest operating system created at the data processing system.

28. A system comprising:
a baseboard management controller, and
a network interface device providing a set of virtual network interfaces, the network interface device having one or more physical network ports and being configured to communicate with a data processing system via an internal physical data bus,
the network interface configured to, on receiving a network message having one or more predetermined characteristics and comprising an authentication key and configuration instructions defining a new virtual network interface, pass the configuration instructions and authentication key to the baseboard management controller which:

verifies the authentication key; and when the authentication key is successfully verified, causes the network interface device to create the new virtual network interface defined in the configuration instructions of the network message, wherein the virtualized data processing system is configured further to run a plurality of guest operating systems running atop a hypervisor, the network interface device being configured to support a different virtual network interface for each of the plurality of guest operating systems, and wherein the network interface device is configured to, in conjunction with creating the new virtual network interface defined in the configuration instructions, via a network interface device driver of the network interface device, message the hypervisor to map the new virtual network interface into a new guest operating system created at the data processing system.

29. The system as claimed in claim 28, wherein the network interface device is further configured to pass Intelligent Platform Management Interface messages received at the network interface device to the Baseboard Management Controller.

30. A virtualized data processing system comprising a network interface device which is configured to provide a set of virtual network interfaces, the network interface device configured to, on receiving a network message having one or more predetermined characteristics and comprising an authentication key and configuration instructions defining a new virtual network interface:

verify the authentication key; and when the authentication key is successfully verified, create the new virtual network interface defined in the configuration instructions of the network message, wherein the virtualized data processing system is configured further to run a plurality of guest operating systems running atop a hypervisor, the network interface device being configured to support a different virtual network interface for each of the plurality of guest operating systems, and wherein the network interface device is configured to, in conjunction with creating the new virtual network interface defined in the configuration instructions, via a network interface device driver of the network interface device, message the hypervisor to map the new virtual network interface into a new guest operating system created at the data processing system.

31. The virtualized data processing system as claimed in claim 30, wherein the network interface device is further configured to store state for connections of the guest operating systems.

32. The virtualized data processing system as claimed in claim 31, wherein the new guest operating system has migrated to the data processing system from another data processing system and the configuration instructions include state for connections of the migrated guest operating system.

* * * * *